United States Patent [19]

Kimura

[11] Patent Number: 5,473,768
[45] Date of Patent: Dec. 5, 1995

[54] CLOCK GENERATOR

[75] Inventor: Takayuki Kimura, Tokyo, Japan

[73] Assignee: NEC Corporation, Japan

[21] Appl. No.: 200,674

[22] Filed: Feb. 23, 1994

[30] Foreign Application Priority Data

Feb. 24, 1993 [JP] Japan .................................. 5-035711

[51] Int. Cl.⁶ .................................................. G06F 1/04
[52] U.S. Cl. ...................... 395/550; 364/270; 364/270.2; 364/271.5; 364/259.1; 364/DIG. 1; 395/800
[58] Field of Search ...................................... 395/800, 550; 327/142.152, 153, 261

[56] References Cited

U.S. PATENT DOCUMENTS

| | | | |
|---|---|---|---|
| 4,560,939 | 12/1985 | DeKarske et al. | 327/145 |
| 4,669,042 | 5/1987 | Henderson | 364/181 |
| 5,118,975 | 6/1992 | Hillis | 307/602 |
| 5,369,640 | 11/1994 | Watson | 371/1 |

FOREIGN PATENT DOCUMENTS 316943 11/1988 European Pat. Off. .
9207316 4/1992 WIPO .

Primary Examiner—Eric Coleman
Attorney, Agent, or Firm—Ostrolenk, Faber, Gerb & Soffen

[57] ABSTRACT

A selector 11 selects one of a plurality of reference clock signals based upon a selection signal. A hardware reset signal 103 is delayed by a predetermined time. The selection signal is sent to the selector responsive to a set signal. The sending of the selection signal is stopped responsive to the delayed hardware reset signal. The set signal is delayed by a predetermined time. A first flip-flop 13 is set in response to the hardware reset signal or a software reset signal, is supplied with the delayed set signal as a count input, and is supplied with low level as a data input. A second flip-flop 16 receives a logic AND signal of an output signal from the selector 11 and the hardware reset signal as a count input and receives a logic OR signal of the output of the first flip-flop 13 and an inverted output of the second flip-flop 16 as a count signal, and generates a clock output.

3 Claims, 5 Drawing Sheets

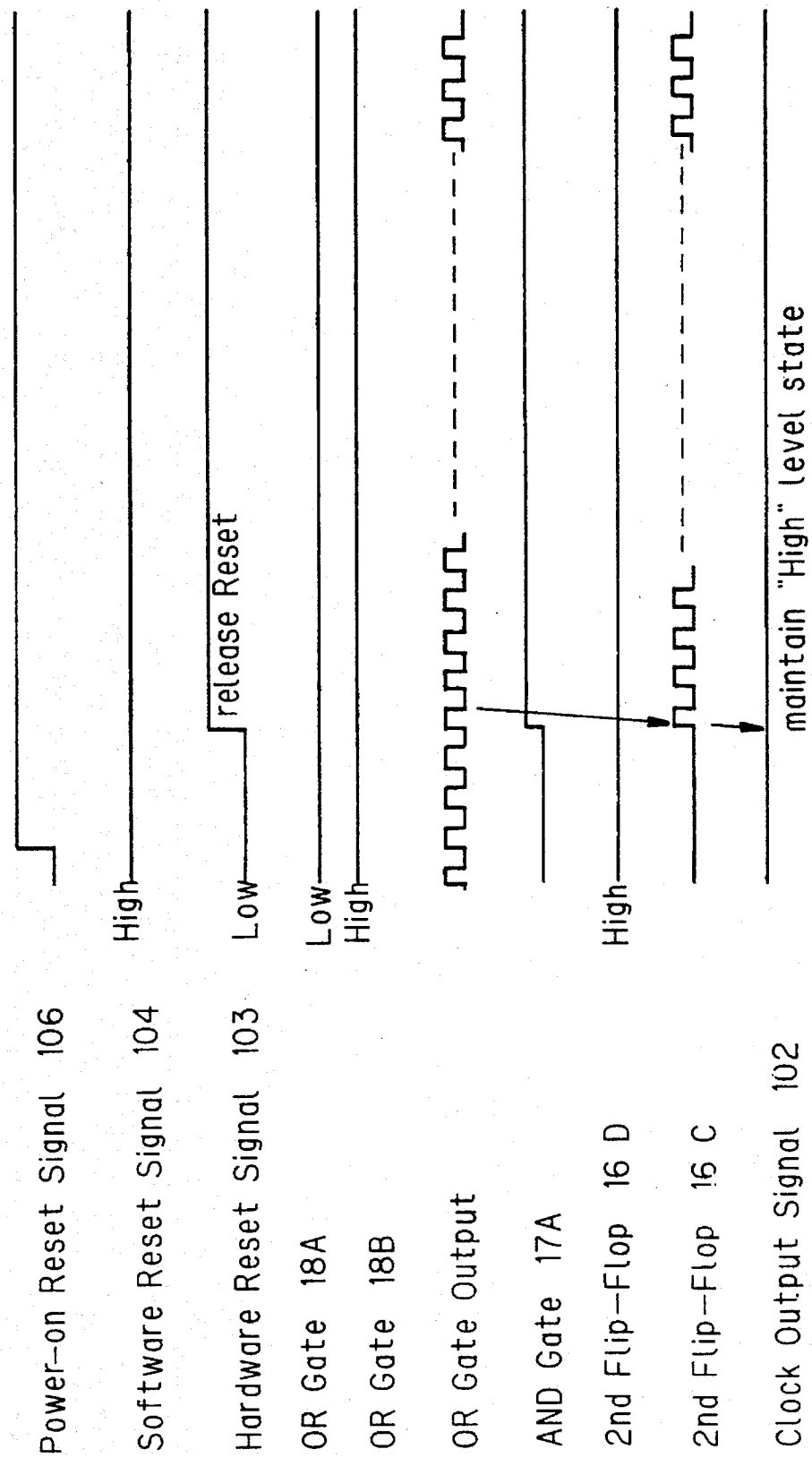

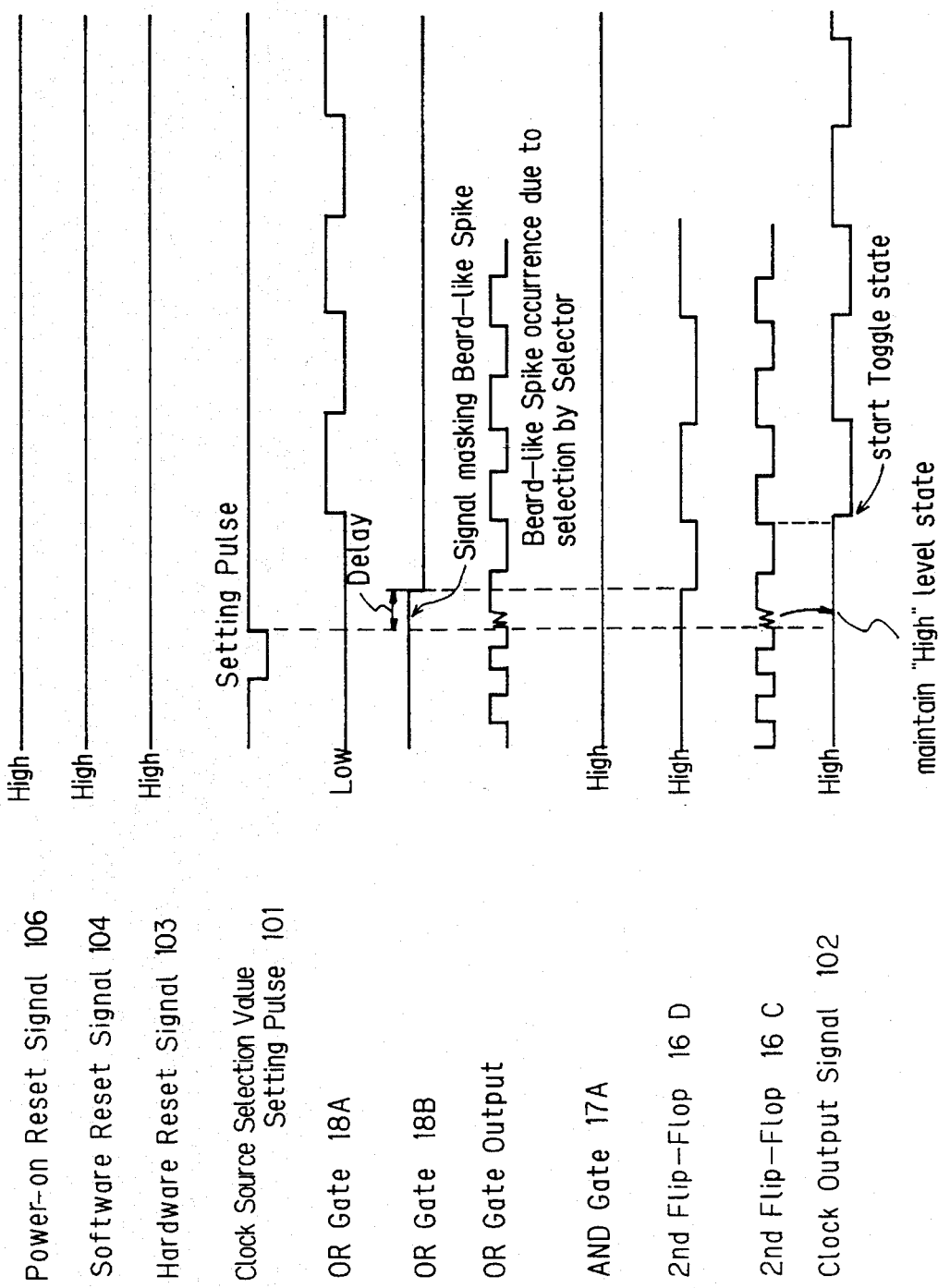

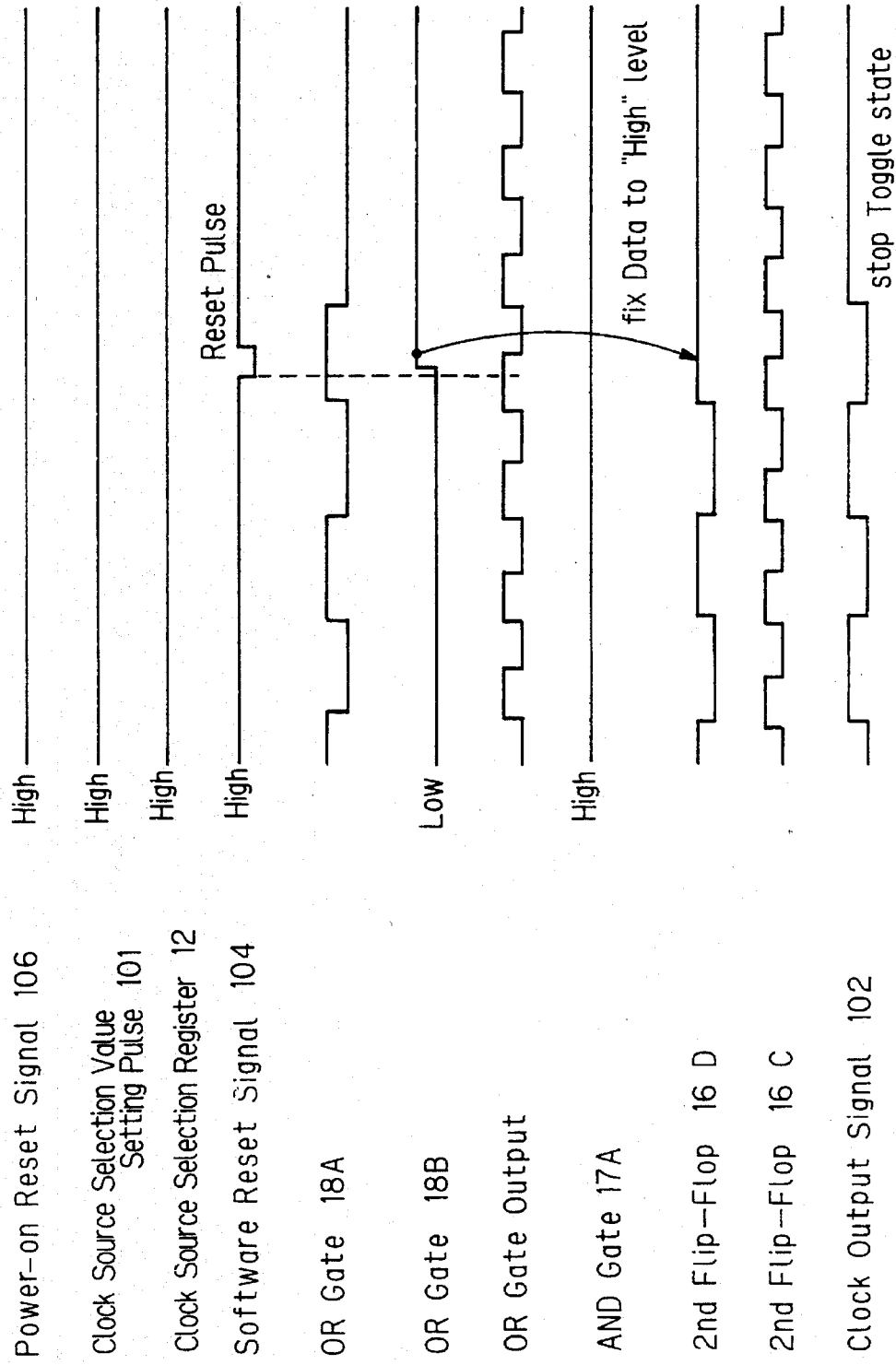

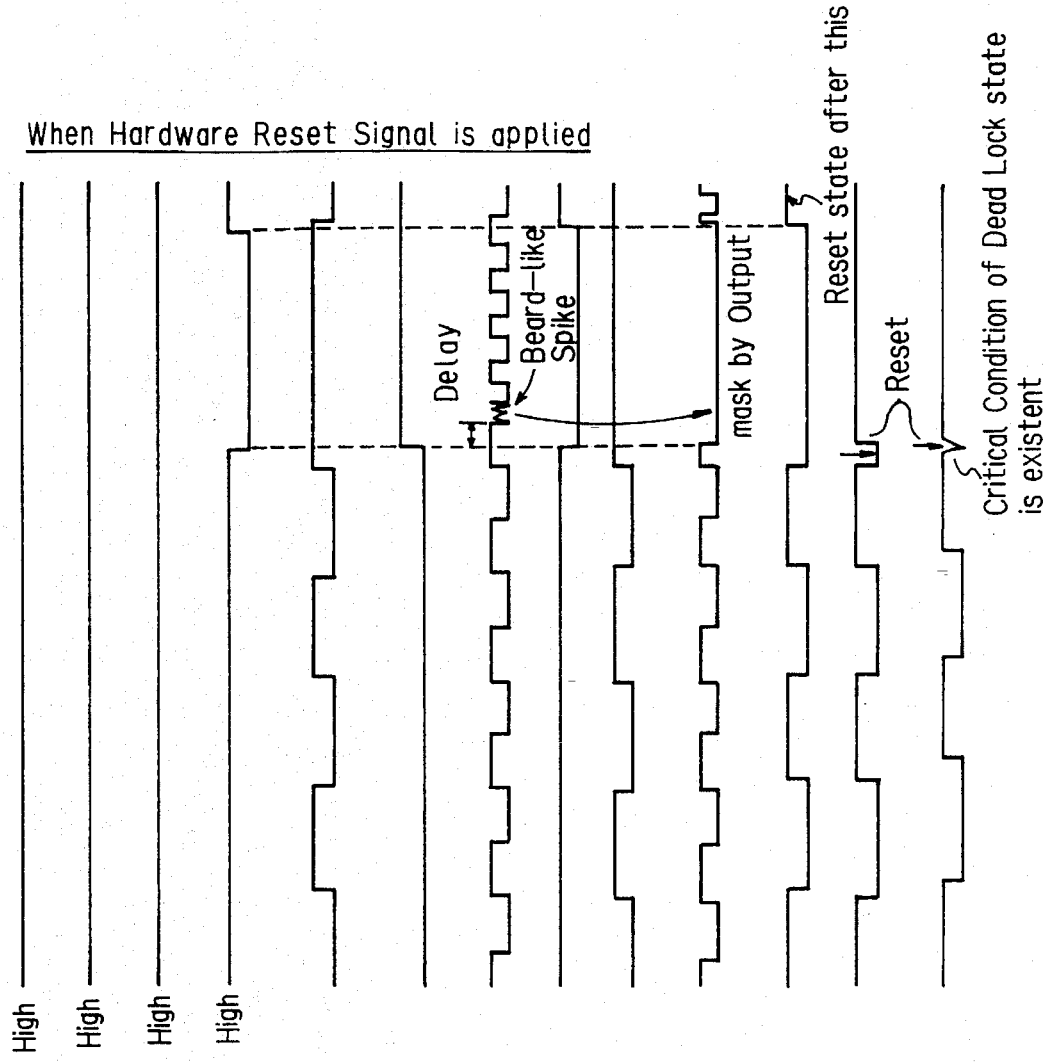

CLOCK GENERATOR

BACKGROUND OF THE INVENTION

The present invention relates to a clock generator and, more particularly, to a clock generator capable of starting and stopping of clock signal transmission without intrusion of spike-like sharp pulses.

A conventional clock generator is not provided with a function of starting and stopping clock signal generation, but a function of stopping the clock transmission immediately upon reception of a reset signal.

In such a conventional clock generator, upon reception of the reset signal during the clock transmission, the clock output level is immediately fixed to a predetermined reset value. Therefore, depending on the reception timing of the reset signal, occurrence of the waveform deterioration such as sharp spike pulses in the clock signal is liable.

SUMMARY OF THE INVENTION

An object of the present invention is therefore to provide a clock generator capable of start and stop of the clock signal transmission without any waveform deterioration.

According to one aspect of the present invention, there is provided a clock generator comprising a selector for selecting one of a plurality of clock signals, a first delay element for delaying a hardware reset signal by a predetermined time, a clock source selection register for holding set value data for designating one of the clock signals to be selected and receiving as a reset input the delayed hardware reset signal through the first delay element, a second delay element for delaying a clock source selection value setting pulse used to write the set value data in the clock source selection register, a first flip-flop for receiving as a count input the delayed clock source selection value setting pulse through the second delay element, and responsive to an OR signal of a software reset signal and the hardware reset signal, generating a "Low" level signal, a second flip-flop for receiving as a clock signal an AND signal of the output signal of the selector and the hardware reset signal, and receiving as data input an OR signal of the inversion of its own output signal and the output signal of the first flip-flop, and an input terminal, to which is input a power-on reset signal for independently setting the second flip-flop signal.

According to another aspect of the present invention, there is provided a clock generator comprising a selector means for selecting one of a plurality of reference clock signals based upon a selection signal, a first delay means for delaying a hardware reset signal by a predetermined time, means for sending the selection signal to the selector means responsive to a set signal and stopping the send of the selection signal responsive to the delayed hardware reset signal, a second delay means for delaying the set signal by a predetermined time, a first flip-flop means which is set in response to the hardware reset signal or a software reset signal, is supplied with the delayed set signal through the second delay means as a count input,and is supplied with low level as a data input, and a second flip-flop means which receives a logic AND signal of an output signal from the selector means and said hardware reset signal as a count input and receives a logic OR signal of the output of the first flip-flop means and an inverted output of the second flip-flop means, and generating a clock output.

A selector selects one of a plurality of reference clock signals in response to a designation from a clock source selection register which holds data for selecting a reference clock signal. This selected signal is provided from a second flip-flop. Meanwhile, a first flip-flop detects a pulse, which is produced as a result of delaying a clock source selection value setting pulse, i.e., a pulse for writing a predetermined value in the clock source selection register, whereupon it provides a "Low" level output and also outputs an OR of a software and a hardware reset signals. The second flip-flop is set independently by a signal from a power-on reset terminal. It receives as a clock input an AND of the output signal of the selector and the hardware reset signal and also receives the OR of the inversion of its own output signal and the signal from the first flip-flop as data input, whereby it provides a final clock signal. Thus, the start and stop of the clock signal transmission can be obtained without intrusion of any spike-like sharp pulse.

BRIEF DESCRIPTION OF THE DRAWINGS

FIGS. 2 3, 4 and FIG. 5 are timing charts for describing the operation of the embodiment according to the present invention.

DETAILED DESCRIPTION OF THE PREFERRED EMBODIMENT

Figure 1:
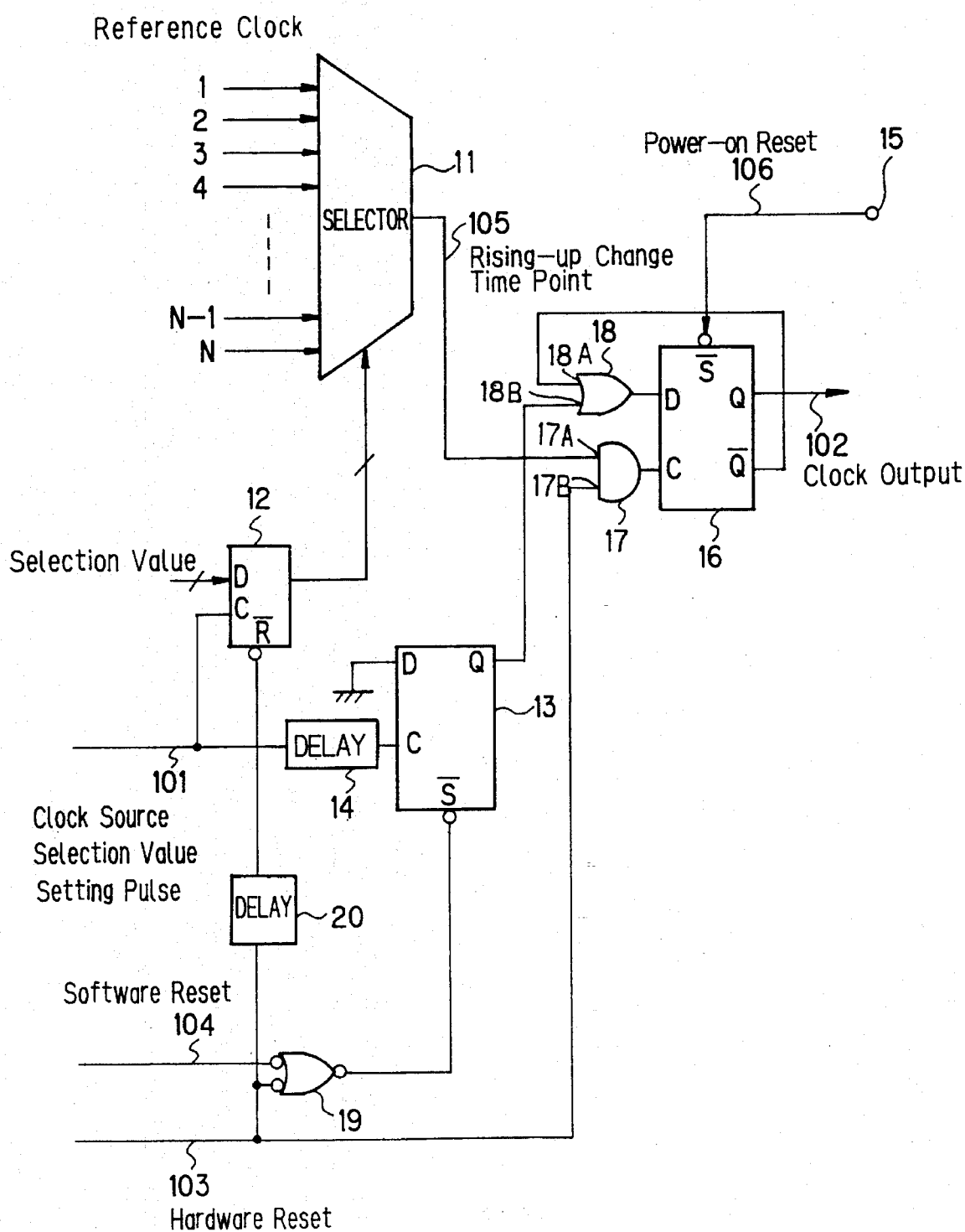
FIG. 1 is a block diagram showing an embodiment according to the present invention.

An embodiment of the present invention will now be described with reference to the drawings. FIG. 1 is a block diagram showing an embodiment according to the present invention.

A clock generator according to the embodiment comprises a selector 11 for selecting one of a plurality of reference clock signals 1 to N, a first delay element 20 for delaying the hardware reset signal 103 by a predetermined time, a clock source selection register 12, which latches data for designating a reference clock signal to be selected by the selector 11 and receives the delayed hardware reset signal 103 through the first delay element 20, a second delay element 14 for delaying a clock source selection value setting pulse 101, i.e., a pulse for writing a predetermined value in the clock source selection register 12, a first flip-flop 13, which receives as a clock input and a set input the delayed clock source selection value setting pulse 101 through the second delay element 14 and an OR signal of the software and hardware reset signals 104 and 103 and Generates a "Low" level signal as Q output signal, D terminal of the first-flip 13 being connected to a Ground, a second flip-flop 16, which receives as a clock signal data input an AND signal of the output signal of the selector 11 and the hardware reset signal 103 and an OR signal of the inversion of its own output signal and the output signal of the first flip-flop 13 respectively, and an input terminal 15 for receiving a power-on reset signal 106 which independently sets the second flip-flop 16.

The operation of the embodiment according to the present invention having the above construction will now be described.

The selector 11 selects one of the plurality of reference clock signals according to the selection value supplied from the clock source selection register 12. The output signal from the selector 11 is supplied to a terminal 17A of an AND gate 17. The hardware reset signal is supplied to the terminal 17B. An output signal of the AND gate 17 is supplied to the second flip-flop 16 as a clock signal.

3

The first flip-flop 13 provides the "Low" level output to a terminal 18B of the OR gate 18 in response to the delayed clock source selection value setting pulse 101 as a clock transmission starting trigger pulse. An output of the OR gate 18 is supplied to the input of the second flip-flop 16.

The operations in each initial state will be sequentially described.

(1) The operation when the power source is turned on will be described. FIG. 2 is a timing chart when the power source in the embodiment according to the present invention is turned on.

According to the power-on reset signal 106 from the input terminal 15, "High" level output signal is generated as the clock output signal when the power source is turned on. The hardware reset signal 103 having a "Low" level is input from an external system responsive to the turn-on of the power source, causing the first flip-flop 13 to generate a "High" level signal as its Q output. The "High" level signal is thus input to the data input output to the data input terminal D of the second flip-flop 16 through the OR gate 18. Thus, the clock output of the second flip-flop 16 is maintained at a "High" level irrespective of the signal input to the clock terminal C. The clock output state is held at the "High" level state even after the releasing of the hardware reset signal 103.

(2) Now, the operation when a selection value is set by the clock source selection value setting pulse 101 after the turning on of the power source will be described. FIG. 3 is a timing chart when a selection value is set in the embodiment according to the present invention.

When some time has elapsed after the turn-on of the power source, the externally input hardware reset signal 103 is changed to a non-active (i.e., "High" level) state. However, since the first flip-flop 13 is continually held at the "High" level state, the data input terminal D of the second flip-flop 16 is receiving the "High" level input although it is in the state that the reference clock signal is input. Thus, it continues to provide the "High" level output.

In this state, when the clock source selection value setting pulse 101 is input for setting the selection value, the selector 11 selectively outputs one of the reference clock signals 1 to N to the terminal 17B of the AND Gate 17. However, since the first flip-flop 13 is still held in the "High" level state, the second flip-flop 16 is held in the "High" level state irrespective of the waveform that may appear at its clock terminal C. This operation is important in that the occurrence of a beard-like spike in the clock signal output of the second flip-flop 16 is prevented even when chattering peculiar to the selector 11 occurs at the instant of change in the selection value of the selector 11.

In this state, responsive to the input of the delayed clock source selection value setting pulse 101 through the second delay element 14 to the clock terminal C of the first flip-flop 13, the output of the first flip-flop 13 is inverted to a "Low" level. As a result, after delaying by the second delay element 14, the terminal 18A of the OR Gate 18 becomes valid, and the second flip-flop 16 is set to a toggle state. Subsequent to this instant, the second flip-flop 16 performs a toggle operation based upon one of the reference clock signals 1 to N selected by the selector 11 as a reference.

(3) Next, under the above state (2) the operation when the software reset signal 104 is applied will be described. FIG. 4 is a timing chart for describing this operation.

In response to the software reset signal 104 when the clock signal is generated through the toggle operation of the second flip-flop 16, the software reset signal at the input of the OR gate 19 is inverted to the "Low" level state. The first flip-flop 13 is therefore reset to provide a "High" level output signal, causing the data input terminal D of the second flip-flop 16 "High" level. The flip-flop 16 generates a "High" level output in response to a rising-up change time point of the signal 105 from the selector 11. Subsequently, irrespective of any rising-up change time point of the signal 105, the second flip-flop 16 continues to generate the "High" level output. That is, the clock signal transmission is substantially stopped. Such a stopping operation of the clock signal transmission is important. Specifically, the clock signal transmission is not stopped as soon as the software reset signal 104 is applied, but the "High" level state is brought about after the interval of the oscillation period of the reference clock signals 1 to N has been secured.

(4) Now, the operation when the hardware reset signal 103 is applied in the above state (2) will be described. FIG. 5 is a timing chart when the hardware reset is provided in this embodiment. Responsive to the application of the hardware reset signal 103 in the state with the second flip-flop 16 providing the clock signal in its toggle operation, the hardware reset terminal becomes "Low". As a result, the terminal 17B of the AND gate 17 becomes "Low" level, and the its gate output is forcibly made "Low" at this moment. This "Low" level output stops the input of the clock signal to the second flip-flop 16. Thus, irrespective of any signal input from the selector 11 while the hardware reset signal 103 is held at the "Low" level, the output state of the second flip-flop 16 is not changed.

Thus, there is no possibility of occurrence of a spike-like pulse as the final clock output.

Meanwhile, the hardware reset signal 103 initializes the set value of the clock source selection register 12 through the first delay element 20. However, since the reset signal passes through the first delay element 20, the selected state of the selector 11 is initialized after protection of the clock terminal C of the second flip-flop 16 against the noise input has been provided. Thus, in case when the chattering from the selector 11 occurs, spike-like pulses in the form of chattering are masked by the AND gate 17 and do not reach the clock terminal C of the second flip-flop 16. Thus, the state brought about when the hardware reset signal 103 is applied is held. At a subsequent instant when the hardware reset signal 103 is brought back to "High" with the releasing of the hardware reset, if one of the reference clock signals 1 to N that is selected by the selector 11 is "High" level, the final clock output signal becomes "High" level. On the other hand, if the reference clock signal selected by the selector 11 is "Low", the final clock output at this instant is not changed. At a subsequent instant when the clock signal selected by the selector 11 is changed to "High" level, a "High" level output is provided as the final clock output signal. Again in this case, no spike-like pulse occurs as the clock output.

In FIG. 5, there are also shown clock outputs CLK1 and CLK2 generated according to the conventional clock generator. In the drawing, when time interval between the falling timing and the reset timing becomes short the foregoing spike-like clock pulse is generated.

As has been described in the foregoing, according to the present invention it is possible to permit free control of the start and stop of the clock transmission. In addition, with internal masking provided to eliminate the occurrence of spike-like pulses, it is possible to generate a smooth clock signal free from any beard-like spike pulse that may otherwise be intruded when the power source is turned on, when the power source is instantaneously cut off, when an external system reset switch is depressed, when software reset is provided, or when a clock transmission trigger is provided.

What is claimed is:

1. A clock generator comprising:

a selector for selecting one of a plurality of clock signals;

a first delay element for delaying a hardware reset signal by a predetermined time;

a clock source selection register for receiving a clock source selection value setting pulse for writing set value data in said clock source selection register, said clock source selection register holding said set value data for designating one of said clock signals to be selected and receiving as a reset input the delayed hardware reset signal through said first delay element;

a second delay element for delaying said clock source selection value setting pulse;

a first flip-flop for receiving as a clock input the delayed clock source selection value setting pulse through said second delay element, and responsive to an OR signal of a software reset signal and said hardware reset signal to generate a "Low" level output signal;

a second flip-flop for receiving as a clock input an AND signal of the output signal of said selector and said hardware reset signal, and receiving as data input an OR signal of the inversion of its own output signal and the "Low" level output signal of said first flip-flop; and said second flip-flop having an input terminal to which is input a power-on reset signal for independently setting said second flip-flop.

2. A clock generator comprising:

a selector means for selecting one of a plurality of reference clock signals based upon a selection signal;

a first delay means for delaying a hardware reset signal by a predetermined time;

means for sending said selection signal to said selector means responsive to a set signal and stopping the sending of said selection signal responsive to the delayed hardware reset signal;

a second delay means for delaying said set signal by a predetermined time;

a first flip-flop means which is set in response to said hardware reset signal or a software reset signal, is supplied with the delayed set signal through said second delay means as a clock input and is supplied with a low level as a data input; and a second flip-flop means which receives a logic AND signal of an output signal from said selector means and said hardware reset signal as a clock input and receives a logic OR signal of said output of said first flip-flop means and an inverted output of the second flip-flop means as a data signal, said second flip-flop means generating in response to said clock input and said data signal a clock output.

3. A clock generator in claim 2, wherein said second flip-flop is set by a power turn-on set signal.

* * * * *